J. GALUSKA.
CAR TRUCK.
APPLICATION FILED OCT. 7, 1910.
1,057,818.
Patented Apr. 1, 1913.
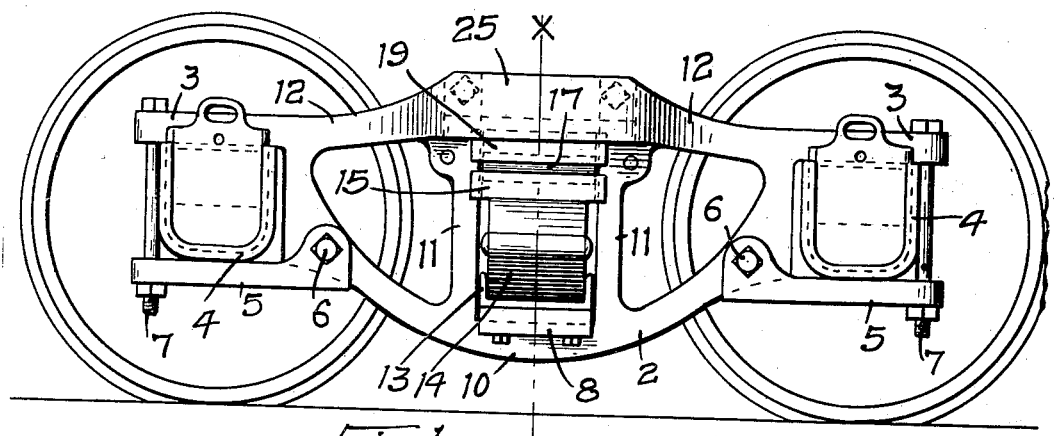
Fig 1.
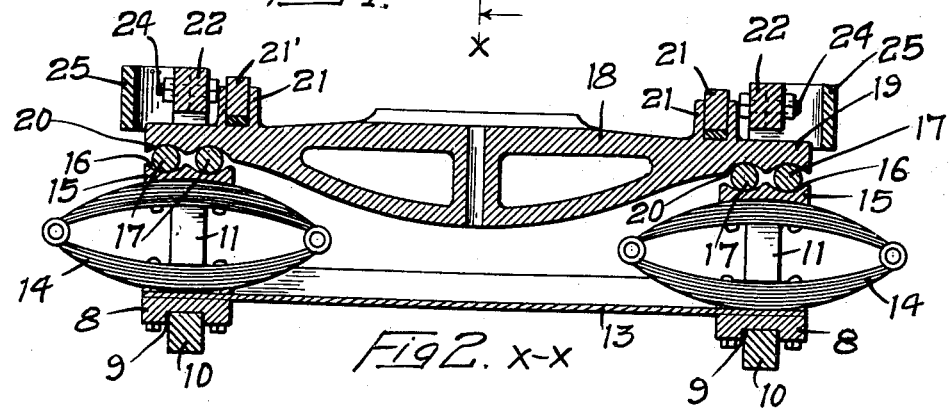
Fig 2. X-X
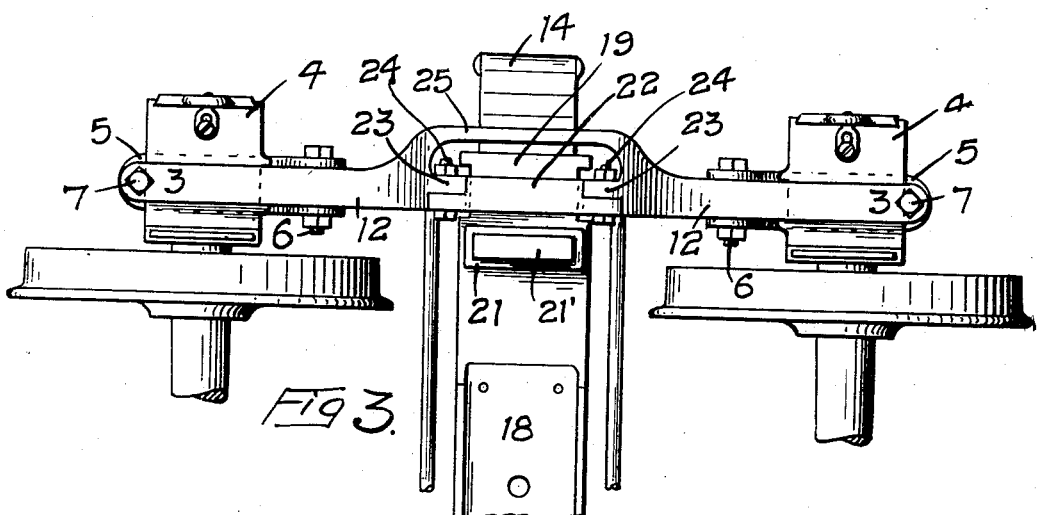
Fig 3.
WITNESSES
A. W. Walstrom
H. E. Sorensen
INVENTOR
JOHN GALUSKA
BY Paul & Paul
ATTORNEYS

UNITED STATES PATENT OFFICE.

JOHN GALUSKA, OF MINNEAPOLIS, MINNESOTA.

CAR-TRUCK.

1,057,818. Specification of Letters Patent. Patented Apr. 1, 1913.

Application filed October 7, 1910. Serial No. 585,879.

*To all whom it may concern:*

Be it known that I, JOHN GALUSKA, of Minneapolis, Hennepin county, Minnesota, have invented certain new and useful Improvements in Car-Trucks, of which the following is a specification.

The object of my invention is to provide a truck having a frame equipped with separable or easily movable sections or parts which can be easily and quickly knocked down or assembled.

Other objects of the invention will appear from the following detailed description.

This invention consists generally in various constructions and combinations, all as hereinafter described and particularly pointed out in the claim.

In the accompanying drawings forming part of this specification, Figure 1 is a side view of a car truck embodying my invention, Fig. 2 is a sectional view on the line $x$—$x$ of Fig. 1, Fig. 3 is a top or plan view of one side of the truck.

In the drawing, 2 represents one of the side frames of the truck having ends 3 which are adapted to extend over the axle boxes 4.

5 are supporting arms pivoted at 6 on the frame 2 and horizontally supported at their ends by bolts 7 which pass through the said arms and vertically through the ends 3, closing the opening between the arms and the ends 3 and forming a seat for the axle boxes. Upon releasing these arms and allowing them to swing down to a vertical position the axles, or one of them, may be disengaged from the truck without disturbing the other connections. This is of particular advantage in the case of a worn out box or a broken axle or wheel.

Intermediate to the ends of the frame a bolster seat is provided, comprising a block 8 having a recess 9 in its under side to receive the lower rail 10 of the side frame. Parallel bars 11 connect the rail 10 on each side of the block 8 with the upper rail 12. A plate 13 is secured to the block 8 and extends transversely of the truck to the opposite corresponding frame. Upon this plate, on each side of the truck, the springs 14 are mounted, as shown in Fig. 2, this type of spring being arranged lengthwise of the plate or crosswise with respect to the truck. The usual type of coil spring may be substituted in place of these leaf or flat springs. Upon the upper section of these springs, intermediate to the ends thereof, I provide a block or saddle 15 having depressions 16 in its upper surface to receive the rollers 17, which extend transversely of the springs and are adapted to roll in said depressions and allow a slight lateral movement of the bolster and the mechanism supported thereby. The bolster 18 extends transversely of the truck and has ends 19 provided with recesses 20 in their end surfaces to fit the curvature of the rollers 17, and said ends are, also provided with upwardly projecting lugs 21, which form guides for the bearing blocks 21'. Bars 22 extend across the ends of the bolster and form continuations of the end portions of the rails 12. These bars close the opening at the top of the frames 2 leading to the bolster seats and are secured to lugs 23 provided on said frames on each side of said opening by means of removable bolts 24.

The upper rails 12 of the side frames preferably have strengthening webs 25 formed integrally with the rails 12 at the ends of the webs and bridging the bolster seat opening or transverse pocket, being extended out a sufficient distance on each side of the truck to allow the bolster to be dropped down upon said seat in the transverse pockets between the flaps of the upper rails. Upon the removal of the bars 22, the bolster may be separated from the truck frame without disturbing any of the other connections.

This invention may be applied to a truck having any number of wheels and axles and to any style of truck, the separable parts allowing the convenient assembling of the truck and greatly facilitating the separation of the frame from the axles and bolster.

I claim as my invention:—

In a car truck, side frames having end portions and intermediate upper and lower chords and upright parallel bars connecting said upper and lower chords, blocks having recessed under surfaces seated on said lower chords between said parallel bars, a plate secured at its ends to said blocks and connecting the lower chords of said frames, springs having bearings on said blocks, blocks seated on the upper portions of said springs and having recessed upper faces, the bottoms of said recesses being curved, anti-friction rollers seated therein and a bolster having its ends inserted between said anti-friction rollers and said upper chords, the under faces of the ends of said bolster being recessed and resting on said rollers, the upper chords of said frame above and adjacent to the ends of said bolster having removable sections to allow the convenient insertion and removal of said bolster.

In witness whereof, I have hereunto set my hand this 28" day of September, 1910.

JOHN GALUSKA.

Witnesses:
GENEVIEVE E. SORENSEN,
ALICE GOLDEN.